Patented Jan. 5, 1954

2,665,259

UNITED STATES PATENT OFFICE 2,665,259

ABSORBENT AND PROCESS FOR PREPARATION THEREOF

John B. Buffett, Media, Pa., assignor to Attapulgus Minerals and Chemicals Corporation, Philadelphia, Pa., a corporation of Maryland No Drawing. Application March 18, 1953, Serial No. 343,250

16 Claims. (Cl. 252—449)

This invention relates to improvements in clay materials for absorbing oil, grease, water, and the like, and more particularly to a highly absorbent material composed of clay of the attapulgite type, and especially Georgia-Florida fuller's earth, and a cement or other cementitious material which will produce a basic water extract, and to a process for the preparation thereof.

This application is a continuation-in-part of copending patent application, Serial No. 210,989, filed February 14, 1951, now abandoned.

Attapulgite type clays have the general formula $Mg_5Si_8O_{20}.8H_2O$ and are naturally active, absorptive clays. It is common practice to improve the natural absorbency of attapulgite by controlled crushing, drying, milling, and similar processes. The resulting product is adapted among other uses as a floor cleaner whereby oil, grease, water, and the like will be absorbed by the clay to keep the floor free of undesirable fluids. While such attapulgite clay of increased absorbency is a satisfactory and useful absorbent material for many purposes, it is desirable to further increase the absorbency thereof so that a smaller amount of such material may be required for a particular purpose than has been required heretofore.

Applicant has discovered that a highly absorptive and relatively hard material may be formed by compounding an attapulgite type clay, especially Georgia-Florida fuller's earth, which has not been dried to a V. M. content below 10% with a cement or other cementitious material which will produce a basic water extract and in a ratio of clay to cement of from 2:1 to 20:1. The improved clay material has an absorbency greatly in excess of attapulgite treated in accordance with methods heretofore employed for improving the absorptivity of clay, and in addition is of sufficient hardness to be adapted for use in all processes in which clay absorbents are commonly employed. It is especially adapted for use as a floor cleaner, which requires that the absorbent material be sufficiently hard as to withstand, without substantial breaking or crumbling, the weight of a person.

The only clays which are suitable for producing the improved absorptive material in accordance with this invention are those of the attapulgite type. Georgia-Florida fuller's earth is particularly suitable for this purpose.

As above pointed out, mixed with the attapulgite clay is a cement or other cementitious material, which will yield a basic solution when extracted with water. A natural cement, a pozzolana cement, or Portland cement, or any other common type of cement may be employed; however, Portland cement is especially suitable. Other cementitious materials which may be used include calcium oxide, magnesium oxide, and all other common limes, and also the hydraulic limes. Of these, however, calcium oxide is preferred.

The amount of cementitious material added should be such that the ratio of clay to cement is from 2:1 to 20:1, and preferably from 3:1 to 10:1, especially good products being obtained with a clay-ratio of 5:1. Within those limits, variations in the amount of cement have only small effect upon the quality of the product. However, as the proportion of cement is increased the absorbency increases while the hardness decreases.

The absorbent materials produced in accordance with this invention are greatly increased in absorbency over the heretofore known clay absorbents. By way of comparison, whereas attapulgite treated by conventional methods has a maximum oil retention of from 75 to 80, the absorbent material produced in accordance with this invention may possess an oil retention of about 120 and higher. Moreover, an improved absorbent material of this invention, having a V. M. content of not more than 40%, is characterized by an absorbency greatly in excess of attapulgite clay having a corresponding V. M. content and treated in accordance with methods heretofore employed for improving the absorptivity of clay. The oil retention values set forth herein were determined by the following procedure: a 50-gram sample of the absorbent is placed in a 500-ml. beaker and covered completely with oil having the following characteristics: gravity, 21.7° A. P. I.; viscosity at 100° F. of 557, and at 210° F. of 52.6 Saybolt seconds universal. After standing for 15 minutes to soak, the mixture is stirred to assure complete wetting. The mixture is transferred to a 111 mm. I. D. Buchner funnel and filtered through a No. 42 filter paper for two hours under 12-inch vacuum and at a temperature of from 150° to 175° F. Finally, the absorbent cake is removed from the funnel and weighed. The increase in weight of absorbent sample expressed as per cent of the original sample is designated as the oil retention value. It is recognized in the art that the ability of a material to absorb oil is also an indication of absorptivity to other fluids.

The improved absorbents further are sufficiently hard so as to be suitable for use in substantially all processes employing conventional clay absorbents. For use as a floor cleaner and for most other conventional uses, it is essential that the absorbent possess a hardness value determined by the method below set forth in excess of 60. The absorbents of the present invention range from about 65 to 80 or more.

In describing the method employed for determining hardness of an absorbent, the mesh of the absorbent will be assumed to be 10/60, that is, the absorbent will pass through a 10 mesh standard Tyler screen but will be retained by a 60 mesh screen. It is to be understood, however, that the method is equally adapted for other mesh material.

A 50-gram sample of the absorbent is placed in the pan of a Ro-Tap testing screen shaker, together with ten 5/8" steel balls. The pan is placed in the usual manner in the Ro-Tap shaker. Also inserted in the shaker is a 60 mesh retaining or limiting screen. With the hammer plate in place, but without the hammer operating, the Ro-Tap shaker is placed into operation and allowed to run for 30 minutes. The absorbent then is transferred from the pan to the limiting screen and the Ro-Tap shaker again operated for 5 minutes with the hammer operating to tap the screen and with the pan in position to catch the absorbent passing through the screen. Finally, the portion of absorbent remaining on the screen and the portion of the absorbent passing through and into the pan are weighed separately. The weight of the fraction retained on the screen expressed as per cent of the combined weight of the two portions is designated as the hardness value.

In accordance with this invention, the improved absorbent is prepared by first adding together the cementitious material which, as above mentioned, is of the type capable of giving a basic solution when extracted with water, and attapulgite clay which has not been dried to a volatile matter (referred to hereinafter as V. M.) content below 10%. The cementitious material and attapulgite clay are added together in amounts such that the ratio of clay to cementitious material is in the range of from 2:1 to 20:1. In order to produce the novel absorbent, it is essential that the clay not be dried to a V. M. content below 10% before mixing the clay with the cementitious material. Thus the clay used in this invention may be raw attapulgite clay or attapulgite clay which has been partially dried but not below 10% V. M. Calcination or activation of attapulgite clay to a V. M. below 10% which results when clay is heated to a constant weight at temperatures above about 350° F., destroys the colloidal properties of attapulgite clay as is well known in the art and renders it unsuitable for use in the subject invention. Water is then added to the mixture to raise the V. M. content thereof to at least 60% after which the mixture is pugged, stirred, agitated, or otherwise mixed to obtain a uniform distribution of the ingredients. It is important to note that the clay and cementitious material cannot be mixed in the dry form or in the presence of only a small amount of water but it is necessary to have sufficient water present during the mixing operation to produce a mixture having a V. M. content, as above mentioned, of at least 60%. It has been found that the more water that is present, the better the results. Thus, while the mixture may contain only about 60 to 75% water and the mixing step formed by pugging, a superior product may be obtained by adding sufficient water to produce a thin slurry of the clay and cementitious material which may be simply stirred to obtain the desired uniformity of distribution.

In the event it is desired to accomplish the mixing of the clay and cementitious material by pugging, the water is added in an amount sufficient to raise the V. M. content of the mixture of from 60 to about 75%. Following the pugging step, it is preferable, although not necessary, to extrude the mixture by means of any commercial extruder. The primary purpose of extrusion is to form the material into a convenient shape for drying and therefore extrusion may be eliminated if desired. If the material is to be extruded, however, it is preferable that the V. M. content of the clay-cement mixture be at the highest value consistent with the extrusion operations and with the ready handling of the material. Thus, the amount of water added to the mixture should be as high as possible without making the mixture too soft for handling and extrusion. This condition may be readily determined by observation and inspection.

In the event that it is desired to perform the mixing operation by stirring, sufficient water should be added to form a thin slurry. Uniformity in the mixture usually is obtained with 30 to 60 minutes of mixing.

The uniform mixture finally is treated in any suitable manner to remove sufficient water to increase the absorptivity of the clay to a desired level. The V. M. content of the final product is not critical and it has been found that an absorbent material produced in accordance with this invention having a V. M. content of 40% or less will possess a markedly higher absorptivity than attapulgite clay having a corresponding V. M. content and treated in accordance with methods heretofore employed for improving the absorptivity of clay. Although the V. M. content of the improved absorbent material is not critical, it is to be understood that the lower the V. M. the higher the absorptivity and that best results are obtained by reducing the V. M. of the product to about 5 to 10%.

In removing the water from a clay-cement mixture which has been pugged and if desired extruded, the mixture simply is placed in a convenient drier or kiln and dried preferably under mild drying conditions at a temperature, for example, of about 500° to 750° F. and for a period sufficient to reduce the V. M. content of the mixture to the desired level. In removing the water from a thin slurry of clay and cement which has been mixed simply by stirring or agitating in a suitable mixer, it is preferred to dewater the slurry by filtration, evaporation, or other suitable method following which the material is dried in an oven or kiln, as hereinbefore described.

The dried product, if desired, may be ground to any size suitable for a particular application or use.

It has been found that a somewhat higher oil retention value of the improved absorbent may be obtained by allowing the material to age before drying for a period of a few hours up to two days. No further significant increase will be realized by more prolonged aging.

The following procedure was employed for determining the V. M. content of the various clays and mixtures as set forth herein. An accurately weighed 5- to 6-gram sample of the material is heated in an electric oven at 220° F. for two hours. Thereafter, the sample is heated in a muffle furnace at a temperature of from 1700°–1800° F. for 30 minutes. The sample is again weighed, after cooling to room temperature in a desiccator. The decrease in weight of the sample expressed as per cent is referred to as the V. M. content.

Within the clay-cement ratio range of this invention, that is, from 2:1 to 20:1, only minor differences are noted in the absorptivity and hardness of the product. In most cases the improved attapulgite absorbent has a minimum hardness of about 65 and oil retention value of about 120 or more. The hardness decreases and the absorbency increases slightly as the proportion of cement is increased.

To facilitate the understanding of this invention, the following examples are given by way of illustration.

In Examples I to III, inclusive, the attapulgite clay employed was obtained from an area near Quincy, Florida, and had the following chemical analysis:

| | Weight percent (volatile free basis) |
|---|---|
| $SiO_2$ | 67.0 |
| $Fe_2O_3$ | 3.2 |
| $TiO_2$ | 0.2 |
| $Al_2O_3$ | 11.4 |
| CaO | 2.2 |
| MgO | 10.9 |
| Undetermined | 5.1 |
| | 100.0 |

Example I

A series of mixtures of Portland cement and attapulgite clay, which clay had an oil retention value of approximately 80 after drying for 30 minutes at 750° F., were made up. The mixtures contained varying clay-cement ratios. For two minutes each mixture was pugged in a pug mill and then sufficient water was added to bring the V. M. content up to either 65 or 70. The mixture was pugged for an additional eight minutes. After permitting it to age for two days, the mixture was extruded through a 1-inch thick, ¼-inch straight hole die. Finally, the extruded material was dried in a rotary furnace for 30 minutes at 750° F. By means of a roller mill the absorbent product was ground to 10/60 mesh. In the table following, the oil retention and hardness values are given for the various ratios of clay to cement in the absorbent.

| Ratio, clay/Cement | Extrusion V. M. 65 | | Extrusion V. M. 70 | |
|---|---|---|---|---|
| | Oil retention | Hardness | Oil retention | Hardness |
| 3:1 | 123 | 68 | 149 | 61 |
| 4:1 | 128 | 79 | 142 | 66 |
| 5:1 | 121 | 75 | 133 | 63 |
| 6:1 | 116 | 75 | 125 | 68 |
| 7:1 | 114 | 73 | 117 | 76 |

It will be noted that oil retention decreases and hardness increases as the clay-cement ratio increases. Similar effects upon the final absorbent product result as the V. M. content of the mixture during extrusion is decreased.

Example II

In this case, Example I was repeated except that the aging step was omitted and immediately after the second pugging operation, the mixture was extruded. The following table includes oil retention and hardness values for various clay-cement ratios in the absorbent product.

| Ratio, clay/cement | Extrusion V. M. 65 | | Extrusion V. M. 70 | |
|---|---|---|---|---|
| | Oil retention | Hardness | Oil retention | Hardness |
| 3:1 | 111 | 68 | 122 | 65 |
| 4:1 | 116 | 75 | 127 | 66 |
| 5:1 | 112 | 70 | 116 | 57 |
| 6:1 | 110 | 79 | 116 | 67 |
| 7:1 | 110 | 75 | 114 | 77 |

It will be noted by comparison of the results of Examples I and II that aging slightly improves the oil retention property of the absorbent product.

Example III

In this case, Example II was repeated except that the drying temperature was reduced to 500° F. In the following table the oil retention and hardness values are given for various clay-cement ratios.

| Ratio, clay/cement | Extrusion V. M. 65 | | Extrusion V. M. 70 | |
|---|---|---|---|---|
| | Oil retention | Hardness | Oil retention | Hardness |
| 3:1 | 109 | 68 | 116 | 66 |
| 4:1 | 111 | 74 | 123 | 67 |
| 5:1 | 102 | 70 | 108 | 67 |
| 6:1 | 108 | 77 | 112 | 71 |
| 7:1 | 106 | 75 | 110 | 75 |

By comparison of the results of Examples II and III, it will be seen that slightly higher oil retention values of the product are realized when drying is carried on at higher temperatures.

In Example IV, the attapulgite clay employed was obtained from an area near Amsterdam, Georgia, and had the following chemical analysis:

| | Weight percent (volatile free basis) |
|---|---|
| $SiO_2$ | 65.0 |
| $Fe_2O_3$ | 3.9 |
| $TiO_2$ | 0.3 |
| $Al_2O_3$ | 11.6 |
| CaO | 2.8 |
| MgO | 10.6 |
| Undetermined | 5.8 |
| | 100.0 |

Example IV

A series of mixtures having a clay-cement ratio of 5:1 were made up by individually mixing with such clay, having an oil retention value after calcination for 30 minutes at 750° F. of 80.4, several cementitious materials which give basic water extracts. Each mixture was pugged in a pug mill for two minutes and then sufficient water was added to bring the V. M. content approximately up to the maximum for extrusion, i. e., about 65–75. The mixture was pugged for an additional eight minutes. Immediately thereafter the mixture was extruded. Finally, the extruded material was dried in a rotary furnace for 30 minutes at 750° F. By means of a roller mill the absorbent product was ground to 10/60 mesh. In the table following, the oil retention and hardness values are set forth for various ratios of clay to cement in the absorbent. The V. M. of the mixture as charged to the extruder is set forth opposite the cementitious material.

| Cementitious additive | Oil retention | Hardness |
| --- | --- | --- |
| Portland cement (VM 70) | 147 | 66 |
| Quick lime (VM 73) | 130 | 60 |
| Hydrated calcium lime (VM 73) | 139 | 67 |
| Dolomitic quick lime (VM 66) | 122 | 57 |
| High mag. hydrated lime (VM 73) | 137 | 71 |
| Calcium aluminate cement (VM 70) | 129 | 72 |

*Example V*

This example was carried out to demonstrate that attapulgite clay which has been dried or calcined to a V. M. less than 10% is unsuitable for the purposes of this invention.

Clay-cementitious material mixtures were made up by mixing separately substantially equal amounts (on V. F. basis) of raw attapulgite clay having a V. M. of 50% and of attapulgite clay (2% V. M.) calcined at 1100° F. either with Portland cement or with a saturated water solution of sodium silicate, as set forth in the table below. To each mixture (except the last) sufficient water was added to give a V. M. of 65% and then the mixture was agitated in a pug mill for 30 minutes. Where possible the pugged mixture was extruded. Each mixture thereafter was dried at a temperature of 700° F. and ground to 10/60 mesh. The oil retention ability for each mixture was determined and the results are given in the table below.

| Example | Fuller's earth | | Portland cement, lbs. | Sodium silicate solution, lbs. | V. M. of mixture | Oil retention 10/60 mesh weight, percent |
| --- | --- | --- | --- | --- | --- | --- |
| | Raw, 50%; V. M., lbs. | Calcined at 1,100° F.; 2% V. M., lbs. | | | | |
| I | 10 | None | 1¼ | None | 65 | 109.0 |
| II | None | 5 | 1¼ | None | 65 | 67.2 |
| III | 10 | None | None | 1¼ | 65 | 81.0 |
| IV | None | 5 | None | 1¼ | 65 | 53.4 |
| V | None | 5 | None | 2½ | 20 | 62.6 |

From the results set forth in the table above, it will be apparent that the products produced in accordance with this invention from raw attapulgite clay possess very excellent oil retention characteristics, whereas mixtures of attapulgite clay having less than 10% V. M. and cement or sodium silicate have very low oil retention values.

*Example VI*

5000 grams of raw attapulgite clay having a V. M. of 48.5% were pugged with 530 grams of Portland cement. After mixing in a pug mill for 2 minutes, sufficient water was added to increase the V. M. of the mixture to 68.6%. Mixing was continued for 15 minutes and then the mixture was extruded through a die plate having ¼" diameter straight holes. The extrudate was collected and portions thereof were dried to various V. M. contents as shown in the table below. Each portion was separately ground to yield a 10/60 mesh product. The oil retention value of each sample in weight per cent was determined and the results are presented in the following table.

OIL RETENTIONS OF IMPROVED CLAY-CEMENT ABSORBENT AT VARIOUS CONDITIONS OF FINAL DRYING

| Portion No. | Volatile matter content after final drying, weight percent | Attapulgus oil retentions, weight percent oil retained |
| --- | --- | --- |
| 1 | 1.6 | 132.5 |
| 2 | 5.2 | 133.8 |
| 3 | 10.6 | 120.6 |
| 4 | 18.7 | 108.4 |
| 5 | 33.5 | 65.1 |
| 6 | 42.5 | 33.3 |

The data presented in the table above shows that an absorbent composition produced in accordance with the subject invention and having a V. M. content of 40% or less is operable as an absorbent and specifically that the oil retention value varies from about 33% where the final V. M. is approximately 40% to an oil retention value in excess of 130% where the final V. M. is 1.6%.

While the preferred embodiments of the invention have been described, it is to be understood that minor changes may be made in the details of preparation of the absorbent without departing from the spirit and scope of the invention as defined by the appended claims.

I claim:

1. An absorbent composition formed by mixing a major proportion of attapulgite clay, which has not been dried to a V. M. content below 10%, with a minor proportion, sufficient to increase the absorptivity of said clay, of a cementitious material which will yield a basic water extract and selected from the group consisting of an alkaline earth metal silicate, oxide, and hydroxide, in the presence of sufficient water to produce a mixture having a V. M. content of at least 60%, and drying said mixture sufficiently to increase the absorptivity of said clay.

2. An absorbent composition formed by mixing a major proportion of raw attapulgite clay with a minor proportion, sufficient to increase the absorptivity of said clay, of a cementitious material which will yield a basic water extract and selected from the group consisting of an alkaline earth metal silicate, oxide, and hydroxide, in the presence of sufficient water to produce a mixture having a V. M. content of at least 60%, and drying said mixture sufficiently to increase the absorptivity of said clay.

3. An absorbent composition formed by mixing a major proportion of attapulgite clay, which has not been dried to a V. M. content below 10%, with a minor proportion, sufficient to increase the absorptivity of said clay, of a cementitious material which will yield a basic water extract and selected from the group consisting of an alkaline earth metal silicate, oxide, and hydroxide, in the presence of sufficient water to produce a mixture having a V. M. content of at least 60%, and drying said mixture to a V. M. content of not more than 40%.

4. An absorbent composition formed by mixing attapulgite clay, which has not been dried to a V. M. content below 10%, with a cementitious material which will yield a basic water extract and selected from the group consisting of an alkaline earth metal silicate, oxide, and hydroxide, in a clay-cementitious weight ratio of from 2:1 to 20:1 and in the presence of sufficient water to produce a mixture having a V. M. content of at least 60% and drying said mixture sufficiently to increase the absorptivity of said clay.

5. An absorbent composition formed by mixing attapulgite clay, which has not been dried to a V. M. content below 10%, with Portland cement in a clay-cement weight ratio of from 2:1 to 20:1 and in the presence of sufficient water to produce a mixture having a V. M. content of at least 60% and drying said mixture sufficiently to increase the absorptivity of said clay.

6. An absorbent composition formed by mixing attapulgite clay, which has not been dried to a V. M. content below 10%, with Portland cement in a clay-cement weight ratio of from 3:1 to 10:1 and in the presence of sufficient water to produce a mixture having a V. M. content of at least 60% and drying said mixture sufficiently to increase the absorptivity of said clay.

7. An absorbent composition formed by mixing attapulgite clay, which has not been dried to a V. M. content below 10%, with calcium oxide in a clay-calcium oxide weight ratio of from 2:1 to 20:1 and in the presence of sufficient water to produce a mixture having a V. M. content of at least 60% and drying said mixture sufficiently to increase the absorptivity of said clay.

8. An absorbent composition formed by mixing attapulgite clay, which has not been dried to a V. M. content below 10%, with calcium oxide in a clay-calcium oxide weight ratio of from 3:1 to 10:1 and in the presence of sufficient water to produce a mixture having a V. M. content of at least 60% and drying said mixture sufficiently to increase the absorptivity of said clay.

9. A process for producing an improved absorbent composition comprising mixing a major proportion of attapulgite clay, which has not been dried to a V. M. content below 10%, with a minor proportion, sufficient to increase the absorptivity of said clay, of a cementitious material which will yield a basic water extract and selected from the group consisting of an alkaline earth metal silicate, oxide, and hydroxide, in the presence of sufficient water to produce a mixture having a V. M. content of at least 60%, and drying said mixture sufficiently to increase the absorptivity of said clay.

10. A process for producing an improved absorbent composition comprising mixing a major proportion of raw attapulgite clay with a minor proportion, sufficient to increase the absorptivity of said clay, of a cementitious material which will yield a basic water extract and selected from the group consisting of an alkaline earth metal silicate, oxide, and hydroxide, in the presence of sufficient water to produce a mixture having a V. M. content of at least 60%, and drying said mixture sufficiently to increase the absorptivity of said clay.

11. A process for producing an improved absorbent composition comprising mixing a major proportion of attapulgite clay, which has not been dried to a V. M. content below 10%, with a minor proportion, sufficient to increase the absorptivity of said clay, of a cementitious material which will yield a basic water extract and selected from the group consisting of an alkaline earth metal silicate, oxide, and hydroxide, in the presence of sufficient water to produce a mixture having a V. M. content of at least 60%, and drying said mixture to a V. M. content of not more than 40%.

12. A process for producing an improved absorbent composition comprising mixing attapulgite clay, which has not been dried to a V. M. content below 10%, with a cementitious material which will yield a basic water extract and selected from the group consisting of an alkaline earth metal silicate, oxide, and hydroxide, in a clay-cementitious weight ratio of from 2:1 to 20:1 and in the presence of sufficient water to produce a mixture having a V. M. content of at least 60% and drying said mixture sufficiently to increase the absorptivity of said clay.

13. A process for producing an improved absorbent composition comprising mixing attapulgite clay, which has not been dried to a V. M. content below 10%, with Portland cement in a clay-cement weight ratio of from 2:1 to 20:1 and in the presence of sufficient water to produce a mixture having a V. M. content of at least 60% and drying said mixture sufficiently to increase the absorptivity of said clay.

14. A process for producing an improved absorbent composition comprising mixing attapulgite clay, which has not been dried to a V. M. content below 10%, with Portland cement in a clay-cement weight ratio of from 3:1 to 10:1 and in the presence of sufficient water to produce a mixture having a V. M. content of at least 60% and drying said mixture sufficiently to increase the absorptivity of said clay.

15. A process for producing an improved absorbent composition comprising mixing attapulgite clay, which has not been dried to a V. M. content below 10%, with calcium oxide in a clay-calcium oxide weight ratio of from 2:1 to 20:1 and in the presence of sufficient water to produce a mixture having a V. M. content of at least 60% and drying said mixture sufficiently to increase the absorptivity of said clay.

16. A process for producing an improved absorbent composition comprising mixing attapulgite clay, which has not been dried to a V. M. content below 10%, with calcium oxide in a clay-calcium oxide weight ratio of from 3:1 to 10:1 and in the presence of sufficient water to produce a mixture having a V. M. content of at least 60% and drying said mixture sufficiently to increase the absorptivity of said clay.

JOHN B. BUFFETT.

References Cited in the file of this patent

UNITED STATES PATENTS

| Number | Name | Date |
| --- | --- | --- |
| 2,249,681 | Briggs et al. | July 15, 1941 |
| 2,363,876 | La Lande | Nov. 28, 1944 |
| 2,409,263 | Ewing et al. | Oct. 15, 1946 |